United States Patent
Ewer et al.

(10) Patent No.: US 9,524,309 B2
(45) Date of Patent: Dec. 20, 2016

(54) ENTERPRISE ASSET MANAGEMENT

(71) Applicant: Plantronics, Inc., Santa Cruz, CA (US)

(72) Inventors: Paul Ewer, Santa Cruz, CA (US); Robert J Kelly, San Jose, CA (US); Nicholas K Eisner, Ben Lomond, CA (US)

(73) Assignee: Plantronics, Inc., Santa Cruz, CA (US)

( * ) Notice: Subject to any disclaimer, the term of this patent is extended or adjusted under 35 U.S.C. 154(b) by 477 days.

(21) Appl. No.: 13/945,261

(22) Filed: Jul. 18, 2013

(65) Prior Publication Data

US 2015/0026186 A1    Jan. 22, 2015

(51) Int. Cl.
*G06F 17/30* (2006.01)

(52) U.S. Cl.
CPC ... *G06F 17/30321* (2013.01); *G06F 17/30017* (2013.01); *G06F 17/3092* (2013.01)

(58) Field of Classification Search
CPC ............ G06F 17/30017; G06F 17/3092; G06F 17/30321
USPC ........ 707/741, 755, 778, 797, 802; 715/234, 715/853
See application file for complete search history.

(56) References Cited

U.S. PATENT DOCUMENTS

| | | | |
|---|---|---|---|
| 6,359,892 B1 | 3/2002 | Szlam | |
| 6,490,350 B2 | 12/2002 | McDuff et al. | |
| 6,574,331 B1 | 6/2003 | Forsythe et al. | |
| 6,697,858 B1 | 2/2004 | Ezerzer et al. | |
| 6,791,974 B1 | 9/2004 | Greenberg | |
| 6,798,767 B1 | 9/2004 | Alexander et al. | |
| 6,901,255 B2 | 5/2005 | Shostak | |
| 6,982,953 B1 | 1/2006 | Swales | |
| 7,283,635 B1 | 10/2007 | Anderson et al. | |
| 7,376,123 B2 | 5/2008 | Reuss | |
| 7,738,434 B1 | 6/2010 | Reuss et al. | |
| 2002/0039357 A1 | 4/2002 | Lipasti et al. | |
| 2002/0114441 A1 | 8/2002 | Coussement | |
| 2003/0135647 A1* | 7/2003 | Himmel et al. | 709/245 |
| 2003/0145075 A1 | 7/2003 | Weaver et al. | |
| 2003/0165230 A1* | 9/2003 | Reuss | 379/265.02 |
| 2009/0028134 A1* | 1/2009 | Reuss | 370/352 |
| 2015/0026186 A1* | 1/2015 | Ewer et al. | 707/741 |

OTHER PUBLICATIONS

Xinfeng Wang et al., Design and realization of intelligent monitoring system based object identification, 2008, IEEE, 7777-7780.*

* cited by examiner

*Primary Examiner* — Jean B Fleurantin
(74) *Attorney, Agent, or Firm* — Chuang Intellectual Property Law (57) ABSTRACT

Methods and apparatuses for asset management are disclosed. In one example, a system and method includes receiving an indication of a coupling of an asset to a computing device. An asset identifier stored on the asset is received and an asset data record corresponding to the asset is located. A data associated with the asset is recorded in the asset data record.

20 Claims, 7 Drawing Sheets

Asset Management Data Record 17

Asset Identifier: /602     78AV65420

User Identifier: /604     John Smith

Date of First Use: /606     06/05/13 08:30AM

Warranty Expiration Date: /608     06/05/14

---

User Preferences /610

Volume:     8

Treble:     +5

Bass:     -3

---

Usage Log /612

| Event /614 | Timestamp Data /616 | User Identifier /618 | Workstation Identifier /620 |
|---|---|---|---|
| Coupling | 06/05/13 08:30AM | John Smith | 125 |
| Decoupling | 06/05/13 11:55AM | | |
| Coupling | 06/05/13 12:45PM | John Smith | 125 |
| Decoupling | 06/05/13 05:05PM | | |
| Coupling | 06/12/13 08:55AM | Richard Johnson | 221 |
| Decoupling | 06/12/13 011:50AM | | |
| . | . | . | . |
| . | . | . | . |
| . | . | . | . |

ENTERPRISE ASSET MANAGEMENT

BACKGROUND OF THE INVENTION

Enterprises often issue equipment such as electronic devices ("assets") to their employees. For example, these assets include devices such as notebook computers, smartphones, and headsets. Enterprises desire to keep track of these assets for a variety of reasons, including the fact that they are costs to the enterprise. In the prior art, in order to keep track of these assets, asset information is often manually entered into a computer system. This process is time consuming and inconvenient for large numbers of assets. Even where the asset management process is automated in some manner, such automation is often limited to tracking very basic information, such as that an asset has been received by the enterprise.

As a result, improved methods and apparatuses for asset management are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for asset management are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example, one or more non-transitory computer-readable storage media have computer-executable instructions stored thereon which, when executed by one or more computers, cause the one more computers to perform operations including detecting coupling of an asset to a computing device. The operations include retrieving an asset identifier stored on the asset, determining the asset is a new asset, and creating an asset data record corresponding to the asset. The operations include associating the asset with a user identifier in the asset data record, and recording a data associated with the asset in the asset data record.

In one example, one or more non-transitory computer-readable storage media have computer-executable instructions stored thereon which, when executed by one or more computers, cause the one more computers to perform operations including receiving an indication of a coupling of an asset to a computing device. The operations include receiving an asset identifier stored on the asset and locating an asset data record corresponding to the asset. The operations further include recording a data associated with the asset in the asset data record.

In one example, a headset system includes a headset apparatus and a base device. The headset apparatus includes a microphone, a speaker, a memory comprising a headset identifier, and a first wired communications interface. The base device includes a processor, a Universal Serial Bus (USB) interface, and a second wired communications interface to operable to removably couple to the first wired communications interface. The base device further includes a memory having an asset management application executable by the processor configured to retrieve the headset identifier when the first wired communications interface is coupled to the second wired communications interface and the asset management application is further configured to transmit the headset identifier to a computing device over the Universal Serial Bus Interface.

Enterprise assets such as headsets are often assigned to individuals and can be mission critical to the job. When a headset is not available it can prevent the person from performing their job, and that may result in them taking someone else's headset so they can work. If the headset is not returned, the person to whom it was assigned will find themselves in the same situation and will need to get a replacement and the cycle will be perpetuated until a replacement unit is provided from management. Employees may be financially liable for their headsets. In such cases, the potential increases that they may switch headsets (i.e., take another employee's headset) in order to avoid a financial penalty. If the headsets can be traced to a user it makes it possible for management to correctly identify headsets to their assigned users. In one example, methods and systems are described which provide for tracking of assets such as headsets to the users they were originally assigned to in order to reduce the risk of loss and enable the enterprise to manage the headsets as assets for financial/accounting purposes. In one implementation, a memory in the headset and/or base is used to hold unique identifier information assigned at the factory that can be read by a software application and made available to a database or third party application for use in an asset management database.

In one embodiment, the user is automatically assigned to the headset using their workstation or network login information using a software application programming interface (API). In a further example, the user's identifier can be manually entered through application software. Advantageously, headsets can be assigned to users and tracked. If a headset becomes lost, the user whose headset it is could be identified correctly through a process of elimination. In one example implementation, any headset that is connected to the system will be able to be queried by an application and traced to where it is located. This enables the enterprise management to manage their assets more accurately, and where financial penalties are applied, be able to apply it to the correct individual. It will also allow an enterprise to understand how many headsets they have "on the books" at any given point. In one example, the methods and systems advantageously provide for tracking and gathering data about assets which couple to devices which are already coupled to a network. In one example, a computing device USB port is advantageously being utilized to track the use of an asset. In one example, the asset is an analog headset providing an analog microphone output signal.

The methods and systems described herein in various examples provide a variety of advantages. For example, the methods and systems enable an enterprise to have access to all the asset identifiers assigned to users, and keep track of who is utilizing the assets. This is particularly advantageous where assets tend to get misplaced or stolen or inadvertently used by others to whom the asset was not assigned. The methods and systems help manage and track warranty data associated with assets, including when an asset warranty begins and expires. In certain examples, the methods and systems allow users to automatically retrieve their listening preferences as they move between different workstations, providing convenience and safety. Furthermore, the methods and systems described may be utilized to enhance security, as they present a process for user authentication by comparing a user identifier assigned to an asset with a current user identifier who is currently attempting to use the asset. The methods and systems described herein offer the enterprise the ability to easily track a variety of asset usage data.

Figure 1:
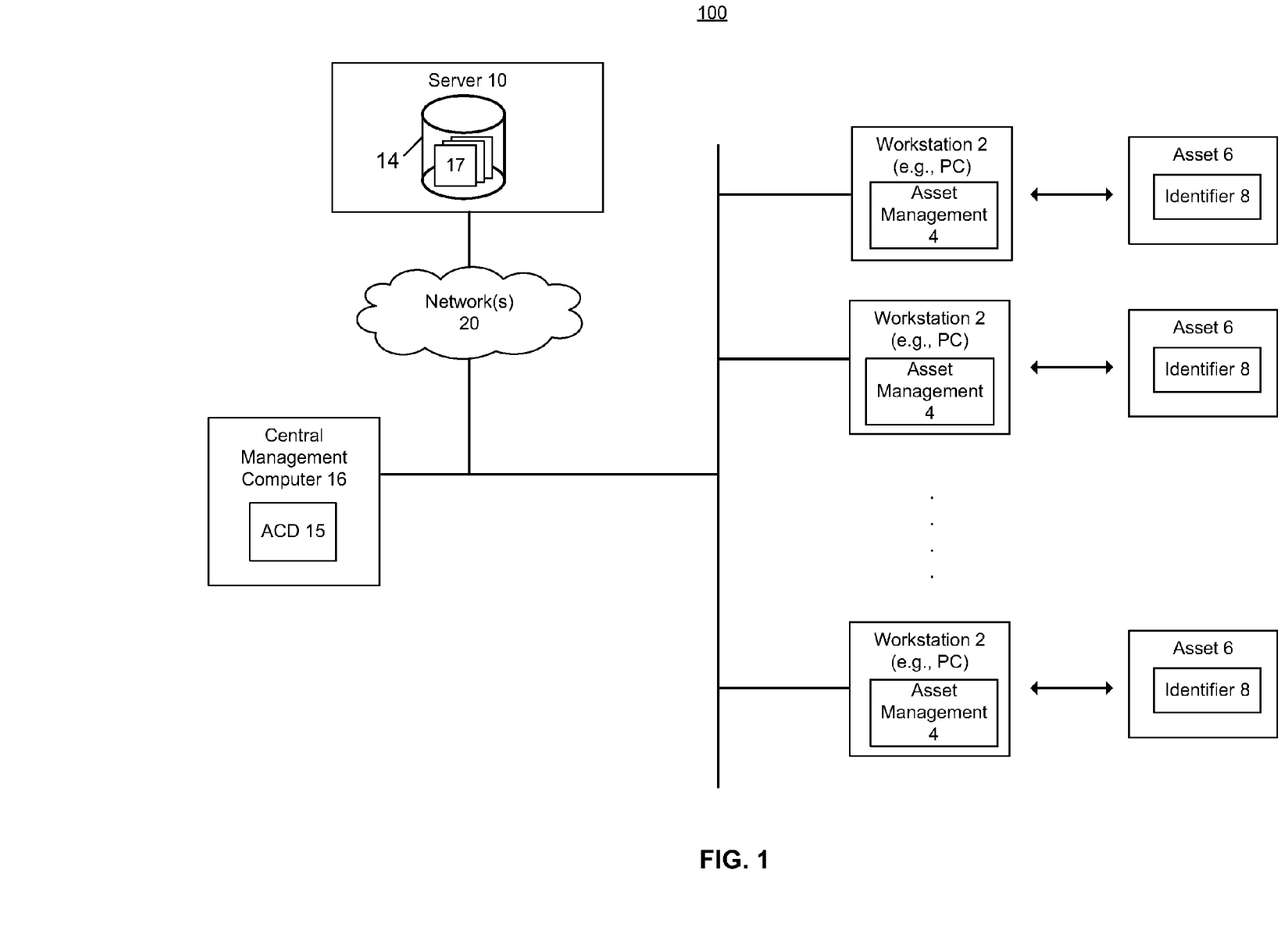
FIG. 1 is a diagram illustrating an embodiment of an asset management system.

FIG. 1 is a diagram illustrating an embodiment of an asset management system 100. In the system 100, one or more workstations 2 are coupled to network(s) 20. A central management computer 16 and a server 10 are also coupled to network(s) 20. For example, communication network(s) 20 may include a local area network, an Internet Protocol (IP) network, cellular communications network, public switched telephone network, IEEE 802.11 wireless network, or any combination thereof. Server 10 can be a server on the local network or a remote server.

In one embodiment, workstation 2 is any computing device, such as a personal computer or notebook computer. Workstation 2 includes an asset management application 4 to manage assets as described herein. In one example, asset management application 4 interfaces with an asset management database 14 residing on server 10. Asset management database 14 stores an asset data record 17 for each asset 6. In a further example, asset management database 14 may be located at central management computer 16.

An asset 6 may be coupled and decoupled to workstation 2 by an asset user. For example, asset 6 may be a headset having a microphone and a speaker. Asset 6 includes a unique identifier 8. For example, unique identifier 8 may be a unique serial number generated by the asset manufacturer and stored in an asset 6 memory.

In one embodiment, asset management system 100 is utilized in a call center environment whereby there are multiple workstations 2 having multiple agents. In further examples, asset management system 100 is implemented by any entity or individual wishing to manage assets. Central management computer 16 includes an automatic call distributor (ACD) 15. When an agent logs into central management computer 16, this indicates that the agent is available to receive calls at the workstation 2 from the automatic call distributor 15. Automatic call distributor is a call control apparatus used for connecting an incoming call to an agent at a workstation 2. The ACD 15 automatically routes telephone calls to workstations 2 connected to the system. The calls may be routed using a variety of algorithms. For example, calls may be routed in a way that balances the call load equally between the workstations, with each workstation occupied by an agent. An ACD 15 may also simply distribute an incoming call by detecting which agent is logged in and not on a call. In one example, each agent is required to login to the system each time he occupies his workstation, and to log off the system each time he leaves his workstation.

In one example operation, asset 6 is coupled to or connected to workstation 2. Asset management application 4 executing on workstation 2 is operable to detect coupling or connection of the asset 6 to workstation 2. Asset management application 4 retrieves asset identifier 8 from asset 6 and determines whether asset 6 is a new asset or a previously used asset 6 based on asset identifier 8. Asset management application 4 determines whether asset 6 is a new asset by searching the asset data records 17 for an asset data record corresponding to the asset identifier 8. If no such record exists, the asset 6 is determined to be a new asset and asset management application 4 creates a new asset data record 17 corresponding to the asset 6. This may be referred to as a new asset initialization.

In the new data record 17, the asset management application 4 associates the asset 6 with a user identifier corresponding to the user of the asset. For example, the user identifier is the user login name or a user first and last name. In one example, asset management application 4 determines the user identifier from the workstation 2, where the user has previously entered login data to authorize access to workstation 2. For example, the user identifier may be obtained from a workstation operating system. The user identifier may be derived from the user login name and/or password entered by the user during the login process.

For example, the login process may be required to access workstation 2 or required to connect to central management computer 16. In the latter case, the user identifier may be obtained from the central management computer 16, which may store the full name of the user corresponding to a user login name and/or password. In yet another embodiment, server 10 receives the asset identifier 8 from workstation 2 and interfaces with central management computer 16 and ACD 15 to retrieve the user identifier.

If asset 6 is a new asset, asset management application 4 records a date and time data (e.g., timestamp data) indicating when the asset 6 was first used. Timestamp data may be obtained from workstation 2, central management computer 16, or server 10. This will coincide with when the asset management record 17 for the asset 6 was created. Advantageously, this first use detection data may be utilized for warranty determination purposes as an alternative to using an asset purchase date. This is desirable in that it allows enterprises to purchase assets in advance of usage without worrying about the warranty period beginning to toll while the asset remains unused. Asset management application 4 also records user preference settings for the use of asset 6 in the asset data record 17. For example, such user preference settings may include volume level, treble setting, and bass setting.

During subsequent uses of asset 6, asset management application 4 detects or receives an indication of a coupling of asset 6 to workstation 2. Asset management application 4 retrieves or receives the asset identifier 8 for asset 6 and locates an asset data record 17 in database 14 corresponding to asset identifier 8. Asset management application 4 retrieves and implements any user preference setting from the asset data record 17. In one example, asset management application 4 retrieves an asset start date from the asset data record 17 and identifies whether the asset warranty has expired. In one example, asset management application 4 determines whether a user identifier corresponding to a current user of the workstation 2 (e.g., obtained from the login data for the workstation 2) matches the user identifier associated with the asset identifier 8 in the asset data record 17. In this manner, asset management application 4 can advantageously determine whether the current user of asset 6 is the person who was originally assigned use of the asset 6.

Asset management application 4 records data associated with the asset 6 in the asset data record 17. The recorded data includes usage data of asset 6. The usage data includes date and time data corresponding to each coupling and decoupling of the asset 6 to the workstation 2. The usage data also includes date and time data corresponding to each coupling and decoupling of the asset 6 to a different workstation from the workstation at which the asset 6 was first coupled when new.

In a further example, asset management application 4 records usage data including a workstation identifier to which the asset 6 was coupled, a user identifier corresponding to a user who was logged into the workstation corresponding to the workstation identifier, date and time data for when the asset 6 was coupled, and date and time data for when the asset 6 was decoupled.

Figure 2:
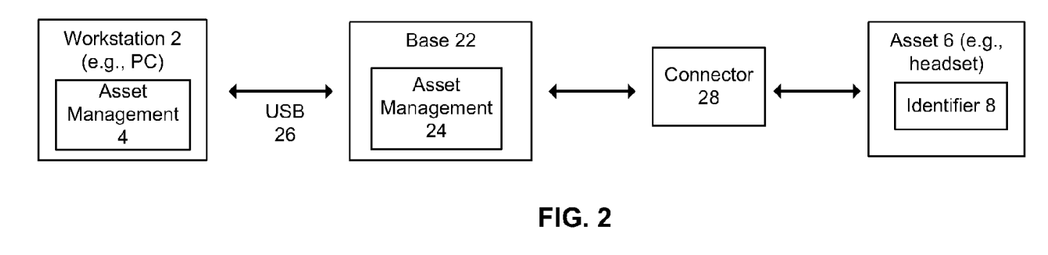
FIG. 2 illustrates coupling of an asset to a workstation in one example.

FIG. 2 illustrates coupling of an asset 6 to a workstation 2 in one example. In this example, asset 6 is a headset with an identifier 8 stored in a headset memory. In this example, detecting coupling of the asset 6 to a workstation 2 includes detecting connection of the asset 6 to a device (e.g., base 22) which is in turn coupled to a Universal Serial Bus (USB) port of the workstation 2.

As shown, the asset 6 is connected to the workstation 2 via a connector 28 and a base 22. For example, base 22 is a USB (Universal Serial Bus) headset adapter connected to workstation 2 via USB connection 26. Base 22 may include audio processing functionality. The connector 28 may be a quick disconnect (QD) device and preferably allows the headset user to quickly disconnect the asset 6 at the connector 28 rather than at the base 22 so that the user may easily and quickly disconnect the headset and leave the area without removing the asset 6. The connector 28 has a headset portion that is connected to the asset 6 and a base portion that is connected to the base 22.

The headset portion and the base portion of the connector 28 are connected to and disconnected from each other so as to connect and disconnect the asset 6 and the base 22. It is noted that although the examples described herein utilize the connector 28 between the asset 6 and the base 22, as is preferred, the asset 6 may alternatively be directly connected to and disconnected from the base 22. In particular, the digital signaling taking place between the base 22 and the workstation 2 for automatic detection of the connection status of the asset 6 is similar regardless of whether the connector 28 is provided.

The asset 6 is preferably in communication with the workstation 2 via the base 22 connected to a USB port of the workstation 2. However, any other suitable communication port may be used for connecting the asset 6 to the workstation 2. In addition, although wired connections are typically and preferably employed, such as between the base 22 and the workstation 2 and between the base 22 and the asset 6, wireless connections may alternatively be employed. For example, the asset 6 may be a cordless headset in wireless communication with the base 22, e.g., using RF technology. The asset 6 can be selectively powered on or off and thus be selectively in communication with the base 22. Thus, the term "connection" and "coupling" utilized herein generally refers to both wired and wireless connections in various examples.

The workstation 2 is generally any suitable processor-based device such as a personal computer (PC), a personal digital assistant (PDA), a digital music player (e.g., MP3 player), a video player (e.g., DVD player), a video game player, and a processor based telephone. The workstation 2 executes application software such as a telephony application software that uses the asset 6, for example, for receiving the user's voice as input and/or for outputting sounds to the user as output. When the user disconnects the asset 6 at the connector 28, the base 22 transmits a digital flag signal indicating a change in the headset connection status to the workstation 2 running the application software, including an asset management application 4.

Similarly, when the user reconnects the asset 6 at the connector 28, the base 22 transmits the flag signal to indicate a change in the headset connection status to the application software running on the workstation 2. Thus, as is evident, the base 22 functions at least in part as a headset connection status signaling module to the workstation 2. For example, base 22 may execute an asset management application 24 which transmits the flag signals corresponding to the asset 6 connection status to asset management application 4. In one example, asset management application 24 operates to retrieve identifier 8 from asset 6 when it is connected and transmit the identifier 8 to asset management application 4.

Figure 3:
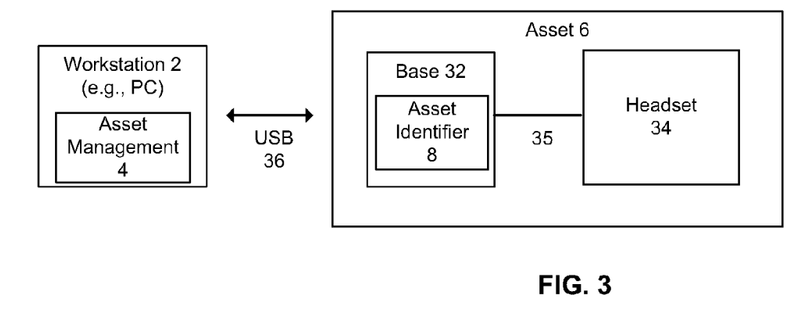
FIG. 3 illustrates coupling of an asset to a workstation in a further example.

FIG. 3 illustrates coupling of an asset 6 to a workstation 2 in a further example. In this example, detecting coupling of the asset 6 to the workstation 2 includes detecting a connection of the asset 6 to a Universal Serial Bus (USB) port of the computing device. As shown in FIG. 3, asset 6 includes a base 32 component and a headset 34 component. Base 32 and headset 34 are connected via a cable 35. Base 32 stores an asset identifier 8 in memory. In one example, base 32 is a USB headset adapter connected to workstation 2 via USB connection 36. In operation, asset management application 4 detects the coupling of asset 6 by detecting the coupling of base 32 to the USB port of workstation 2 and detects the decoupling of asset 6 by detecting the removal of base 32 from the USB port of workstation 2. Upon detection of the coupling of asset 6, asset management application 4 retrieves the asset identifier 8 from base 32.

Figure 4:
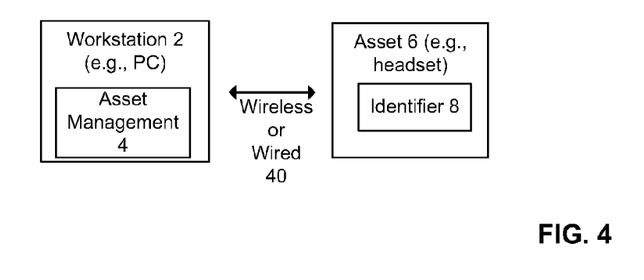
FIG. 4 illustrates coupling of an asset to a workstation in a further example.

FIG. 4 illustrates coupling of an asset 6 to a workstation in a further example. In this example, detecting coupling of the asset 6 to the workstation 2 includes detecting a connection 40 of the asset 6 to a wired or wireless connection communications interface of workstation 2. Asset 6 (e.g., a headset), includes an identifier 8 stored in the headset memory.

In operation, asset management application 4 detects the coupling of asset 6 by detecting either the establishment of a wireless connection (e.g., a Bluetooth connection) between workstation 2 and asset 6 or a physical connection (e.g., USB connection) between workstation and asset 6. In one example, asset 6 is a Bluetooth wireless headset or a DECT wireless headset with a retrievable unique serial number stored in memory. Similarly asset management application 4 detects the decoupling of asset 6 by detecting either a termination of the wireless connection between workstation 2 and asset 6 or the physical removal of asset 6 from workstation 2. Upon detection of the coupling of asset 6, asset management application 4 retrieves the asset identifier 8 from asset 6.

Figure 5:
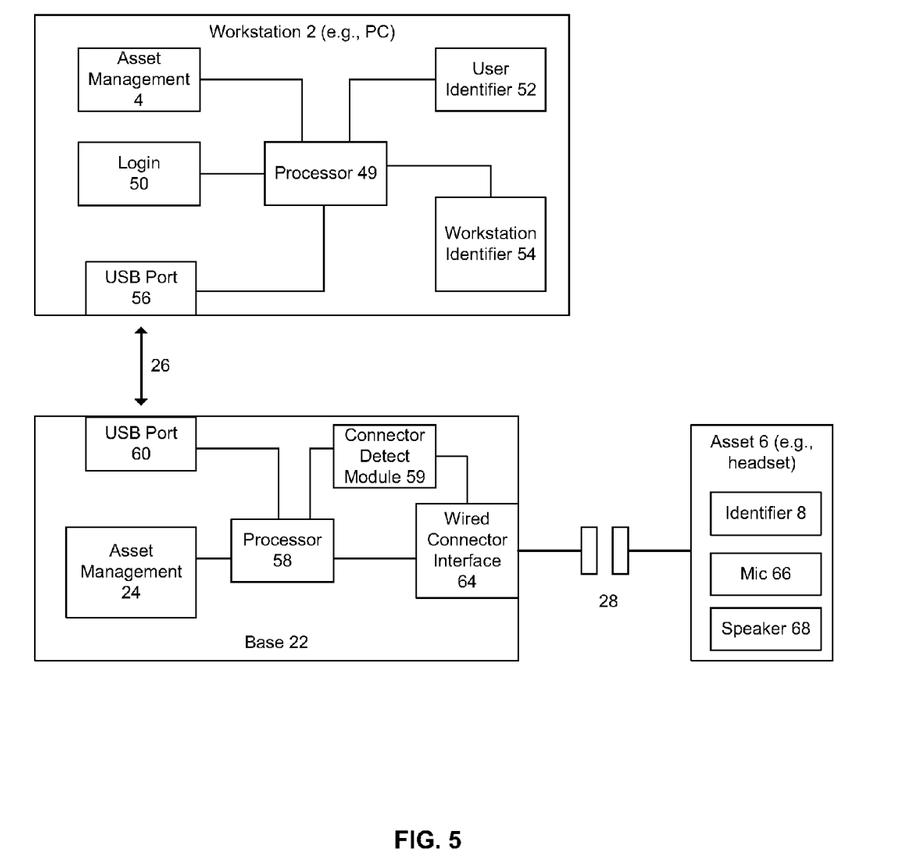
FIG. 5 illustrates a simplified block diagram of the system shown in FIG. 2.

FIG. 5 illustrates a simplified block diagram of the system shown in FIG. 2 in one example implementation. The workstation 2 is generally shown and described as being a PC with a USB port 56 to which a base 22 (e.g., a USB headset adapter) is connected. However, the workstation 2 may be any other suitable processor-based unit and the port connecting the base to the workstation 2 may be any other suitable communications port.

As shown, the host workstation 2 includes a processor 49 such as a CPU that controls hardware and application software on the workstation 2. For example, the processor 49 may execute application software such as a training application, voice recognition application, music or other audio player application, video game application, video player application, and softphone application. The term softphone application generally refers to a telephony application running on a PC or other processor-based host. Processor 49 executes asset management application 4 and login application 50. In one example, asset management application 4 is operable to determine a user identifier 52 and a workstation identifier 54 either from workstation 2 or central management computer 16. The processor 49 communicates with the base 22 via the USB port 56

The base 22 includes a USB port 60 that communicates with and corresponds to the USB port 56 in the workstation 2. The base 22 further includes a connector detect module 59, a wired connector interface 64, an asset management application 24 stored in memory, and a processor 58. In certain examples, base 22 includes a digital-to-analog converter (DAC) and an analog-to-digital converter (ADC). The base 22 may facilitate in providing various features associated with the asset 6 such as gain control, volume control, tone control, treble boost, and/or bass boost. The base 22 may include integrated in-line controls (not shown) for controlling such features. Alternatively, such features may be integrated into a host-based software application. Asset 6 includes an identifier 8 stored in memory, microphone 66, and speaker 68.

In one example, asset connection status of connector 28 is determined by the connector detect module 59, i.e., whether the connector 28 is open or closed. Any suitable mechanism such as electronic state and/or mechanical detection mechanism may be employed by the detect module 59, the connector 28, and/or the processor 58 to detect the status of the connector 28. In particular, the connector detect module 59 or processor 58 either alone or in combination may passively or actively monitor the status of the asset connector 28. As an example of active monitoring, the connector detect module 59 may actively monitor the status of an electrical or mechanical switch provided in the connector 28 by polling the connector 28. The switch in the connector 28 may be configured such that the switch is closed when the connector 28 is closed and is open when the connector 28 is open. Thus, when the switch in the connector 28 is opened or closed, the connector detect module 59 detects the change as a result of the active polling.

Alternatively, the connector detect module 59 may passively monitor for changes in the status of the connector 28 such as by detecting a voltage change at the detect module 59 as a result of, for example, the switch in the connector 28 being opened or closed. In one embodiment, the system may be configured such that the voltage at the interface between the base 22 and the connector 28 is lower when the asset 6 is connected. In addition, depending upon the specific implementation, this voltage change itself may be sufficient to bypass the detect module 59 directly into the processor 58. As yet another alternative embodiment, the processor 49 of the workstation 2 may poll the base 22 for the asset connection status through the USB ports 56, 60.

Regardless of how the status of the connector 28 is monitored, the processor 58 of the base 22 generates the digital asset connection status signal, the value of which depends upon the connection status of the asset 6. The digital asset status signal is preferably configured so as to be interpretable by the workstation 2 and/or base and/or various application software products on the workstation 2 and/or base. The value of the signal or flag indicating the asset connection status is changed when the connection status of the asset 6 changes.

In one example, the flag signal generated by the processor 58 is transmitted to the processor 49 of the PC workstation 2 via the USB ports 56, 60 of the PC workstation 2 and the USB base 22, respectively. Preferably, the flag signal is transmitted from the USB port 56 of the host workstation 2 to the processor 49.

The asset management application 4 (and other desired application software) executed by the processor 49 responds in response to changes in the asset connection status. Specifically, the asset management application 4 is configured to perform certain actions upon occurrence of a corresponding change in the asset connection status flag. In other words, depending on how the asset management application 4 and/or the host workstation 2 are configured, the value of the status flag indicating the asset connection status determines which action(s) the application software and/or host workstation 2 perform.

For example, when the flag signal is transmitted to the processor 49 of the PC workstation 2 indicating that the connector 28 is disconnected, the processor 49 may store timestamp data for the disconnect event in the asset data record 17 of the asset 6.

Upon receiving the flag signal indicating that the connector 28 is reconnected, the processor 49 retrieves the identifier 8 from the asset 6 and stores timestamp data for the connect event in the asset data record 17 of the asset 6. Thus, the processor-based workstation 2 and/or the asset management application 4 are responsive to changes in the asset connection status.

As noted above, the application software executed by the processor 49 is configured to perform certain actions upon occurrence of a corresponding change in the asset connector status. Such actions are typically implemented or otherwise configured in the asset management application 4 and are performed when the workstation 2 is informed of the change in the asset connection status, i.e., whether the asset 6 is in communication with the workstation 2. Detailed examples of actions performed in response to changes in the asset connection status will now be presented although any other suitable actions may be implemented in the application software and/or the workstation 2.

In one example, asset management application 24 executable at base 22 is configured to retrieve the asset identifier 8 when the asset 6 is connected to (i.e., coupled) to the base 22 and the asset management application 24 is further configured to transmit the asset identifier 8 to workstation 2 via USB ports 60, 56. Asset management application 4 receives the asset identifier 8. In one example, asset management application 4 receives the asset identifier 8 and associates it with a user identifier 52 corresponding to a current user of the personal computer. In one example, the operations described herein performed by asset management application 24 are integrated with and performed by asset management application 4 at workstation 2. In a further example, the operations described herein performed by asset management application 4 are integrated with and performed by asset management application 24 at base 22. In yet another example, the operations described herein are divided between asset management application 24 and asset management application 4.

Workstation 2 executing asset management application 4 performs operations including detecting coupling of an asset 6 to a workstation 2. The operations include retrieving an asset identifier 8 stored on the asset 6, and determining the asset 6 is a new asset. In one example, determining the asset 6 is a new asset includes searching a plurality of asset data records in asset database 14 for an asset data record 17 corresponding to the asset identifier 8. If the asset 6 is a new asset, an asset data record 17 corresponding to the asset 6 is created.

In one example, the operations include determining a user identifier 52 from the workstation 2, wherein a user corresponding to the user identifier 52 has previously entered login data to authorize access to the workstation 2. The operations include associating the asset 6 with a user identifier 52 in the asset data record 17. In one example, the user identifier 52 is a user login name or a user first and last name.

The operations further include recording a data associated with the asset 6 in the asset data record 17. In one example, recording a data associated with the asset 6 in the asset data record 17 includes recording a date and time data the asset 6 was first used.

In one example, recording a data associated with the asset 6 in the asset data record 17 includes recording a usage data of the asset 6. The usage data may include date and time data corresponding to each coupling and decoupling of the asset 6 to the workstation 2. The usage data may include date and time data corresponding to each coupling and decoupling of the asset 6 to a different workstation (e.g., as illustrated in FIG. 1) from the workstation 2. The usage data may include a workstation identifier 54 to which the asset 6 was coupled, a user identifier 52 corresponding to a user who was logged into the workstation 2 corresponding to the workstation identifier 54, date and time data for when the asset 6 was coupled, and date and time data for when the asset 6 was decoupled. In one example, recording a data associated with the asset 6 in the asset data record 17 includes recording user preference settings such as audio listening preferences including volume, treble, base, etc.

Once an asset 6 has been used once and associated with a user identifier in a data record 17, usage of asset 6 is tracked and managed by asset management application 4 during subsequent coupling and decoupling to the system 100. Workstation 2 executing asset management application 4 performs operations including detecting coupling of an asset 6 to a workstation 2, receiving an asset identifier 8 stored on the asset 6 and locating an asset data record 17 corresponding to the asset 6. In one example, the operations include retrieving and implementing user preference setting from the asset data record 17. In one example, the operations include retrieving a headset start date from the asset data record 17 and identifying an asset warranty expiration occurrence.

In one example, the operations further include determining whether a user identifier 52 corresponding to a current user of the workstation 2 matches the user identifier 52 associated with the asset identifier 8 in the asset data record 17. Advantageously, this determines whether the current user of the workstation 2 is actually the correct/assigned user of the asset 6 who was initially assigned use of the asset 6 at the time the asset 6 was determined to be new and the data record 17 was created. In one example, if the user identifiers do not match, a warning message is output at workstation 2 and/or the use of asset 6 is blocked. Advantageously, the system thereby reduces incidences of theft or unauthorized borrowing of assets because the assets cannot be used by an unauthorized user. The operations further include recording a data associated with the asset 6 in the asset data record 17. This data may include usage data as previously described.

Figure 6:
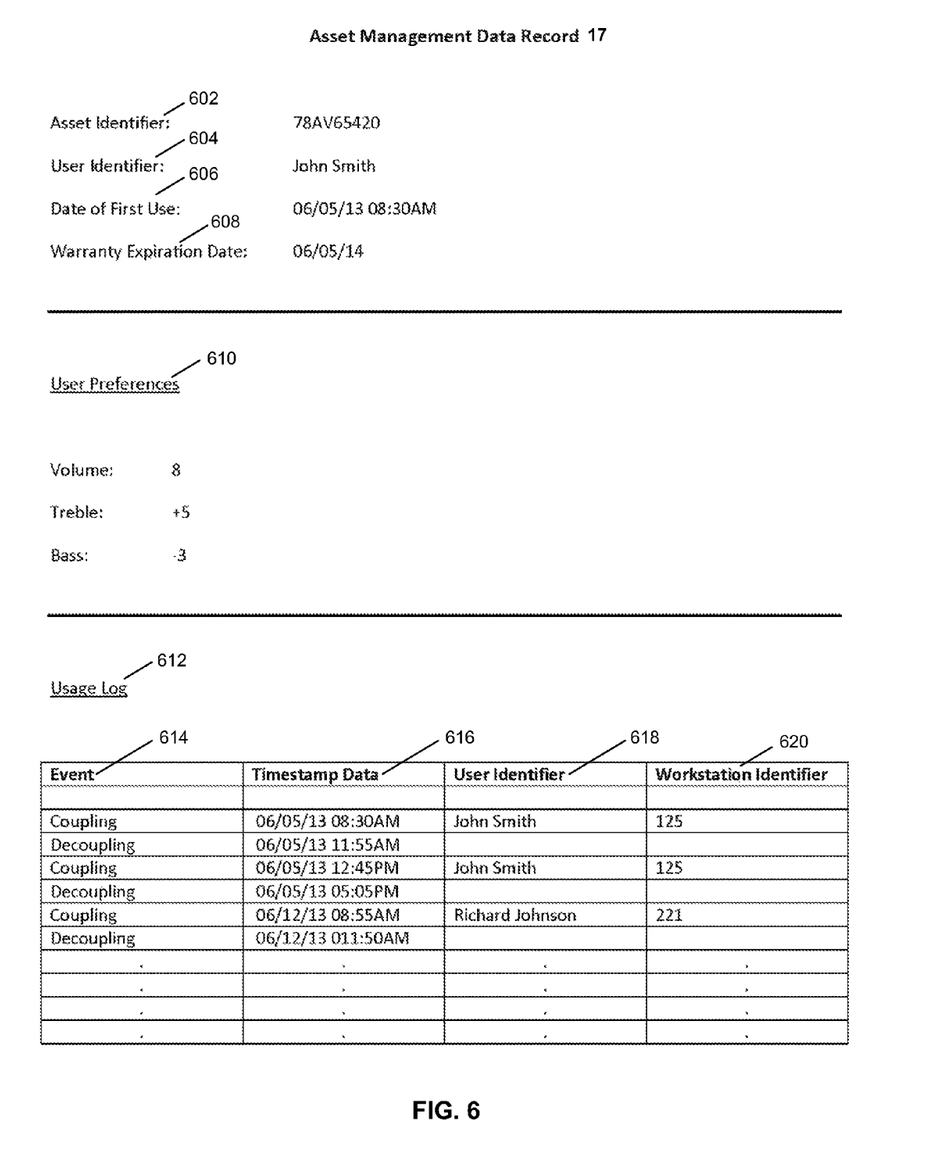
FIG. 6 illustrates an asset data record.

FIG. 6 illustrates an asset data record 17 in one example. An asset data record 17 is created for each unique asset identifier. In the example shown in FIG. 6, asset data record 17 includes data fields for an asset identifier 602, user identifier 604, date of first use 606, and warranty expiration date 608. The warranty expiration date 608 is generated from the date of first use 606 (e.g., 1 year from the date of first use). Asset data record 17 also stores data corresponding to user preferences 610 which are set by the user.

Asset data record 17 includes a usage log 612 which logs all usage of the asset. In the example shown in FIG. 6, the usage log 612 includes data fields for an event type 614, timestamp data 616 associated for the event, user identifier 618 corresponding to the logged in user at the time of the event, and the workstation identifier 620 at which the event occurred. Advantageously, using asset data record 17, it can be determined who is using the asset and whether the user is the original assigned user. It can also be determined exactly where the asset is being used. This information can be sent to the assigned asset user by the asset management application. Where the asset is being used by its proper assignee, data record 17 can be used to monitor a user identifier work hours and workstation locations. Furthermore, the total hours of usage of the asset can be monitored so that the enterprise can determine when it may be necessary to replace an asset.

Figure 7:
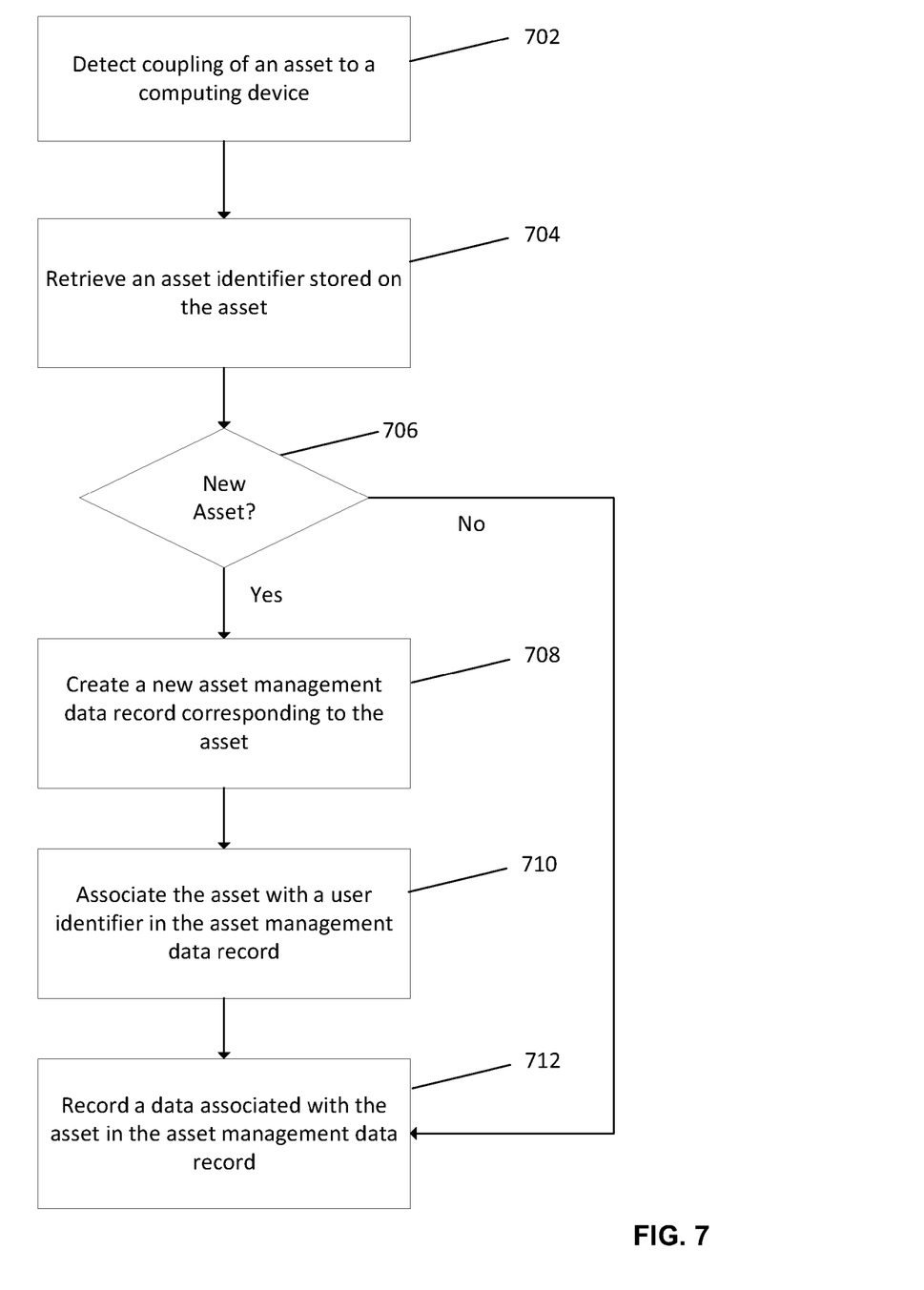
FIG. 7 is a flow diagram illustrating management of an asset in one example.

FIG. 7 is a flow diagram illustrating management of an asset in one example. At block 702, coupling of an asset to a computing device is detected. In one example, detecting coupling of the asset to a computing device includes detecting a connection of the asset to a Universal Serial Bus (USB) port of the computing device. In one example, detecting coupling of the asset to a computing device includes detecting a connection of the asset to a device coupled to a Universal Serial Bus (USB) port of the computing device.

At block 704, an asset identifier stored on the asset is retrieved. At block 706, it is determined whether the asset is a new asset. In one example, determining the asset is a new asset includes searching a plurality of asset data records for an asset data record corresponding to the asset identifier. If no at decision block 706, the process proceeds to block 712. If yes at decision block 706, at block 708, an asset data record corresponding to the asset is created.

At block 710, the asset is associated with a user identifier in the asset data record. In one example, the process further includes determining the user identifier from the computing device, wherein a user corresponding to the user identifier has previously entered login data to authorize access to the computing device. In one example, the user identifier is a user login name or a user first and last name.

At block 712, a data associated with the asset in the asset data record is recorded. In one example, recording a data associated with the asset in the asset data record includes recording a date and time data the asset was first used. In one example, recording a data associated with the asset in the asset data record includes recording a usage data of the asset. For example, the usage data includes date and time data corresponding to each coupling and decoupling of the asset to the computing device or a different computing device.

In a further example, the usage data includes a computing device identifier to which the asset was coupled, a user identifier corresponding to a user who was logged into the computing device corresponding to the computing device identifier, date and time data for when the asset was coupled, and date and time data for when the asset was decoupled. In one example, recording a data associated with the asset in the asset data record includes recording a user preference setting.

Figure 8:
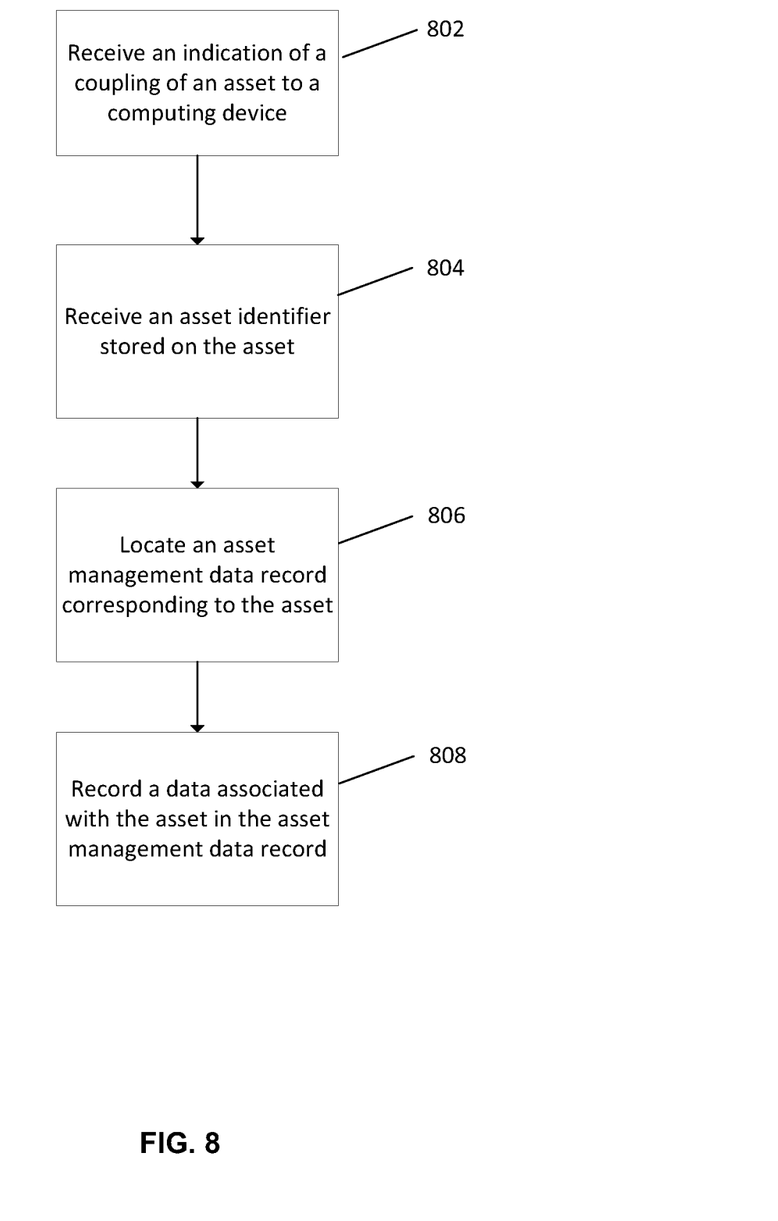
FIG. 8 is a flow diagram illustrating management of an asset in one example.

FIG. 8 is a flow diagram illustrating management of an asset in one example. At block 802, an indication of a coupling of an asset to a computing device is received. In one example, receiving an indication of a coupling of an asset to a computing device includes receiving an indication that the asset has been coupled to a Universal Serial Bus (USB) port of the computing device.

At block 804, an asset identifier stored on the asset is received. At block 806, an asset data record corresponding to the asset is located. In one example, the process includes determining whether a user identifier corresponding to a current user of the computing device matches the user identifier associated with the asset identifier in the asset data record.

At block 808, a data associated with the asset in the asset data record is recorded. In one example, recording a data associated with the asset in the asset data record includes recording a usage data of the asset. For example, the usage data includes date and time data corresponding a coupling and a decoupling of the asset to the computing device.

In one example, the usage data includes a computing device identifier to which the asset was coupled, a user identifier corresponding to a user who was logged into the computing device corresponding to the computing device identifier, date and time data for when the asset was coupled, and date and time data for when the asset was decoupled.

In one example, the process further includes retrieving and implementing user preference settings from the asset data record. In one example, the process further includes retrieving a headset start date from the asset data record and identifying an asset warranty expiration occurrence. In one example, the process further includes receiving an indication of a decoupling of the asset from a computing device.

Figure 9:
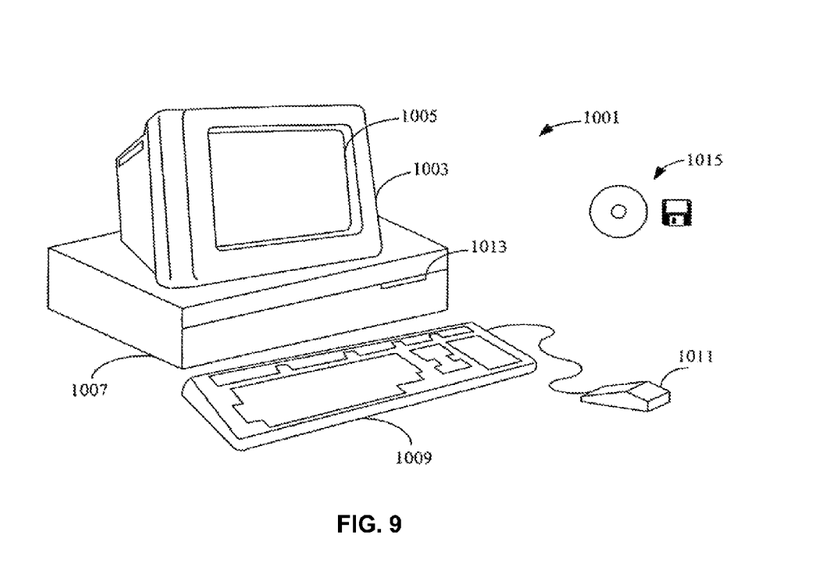
FIG. 9 is a computer that can be utilized with the various embodiments of method and processing described herein in one example.
Figure 10:
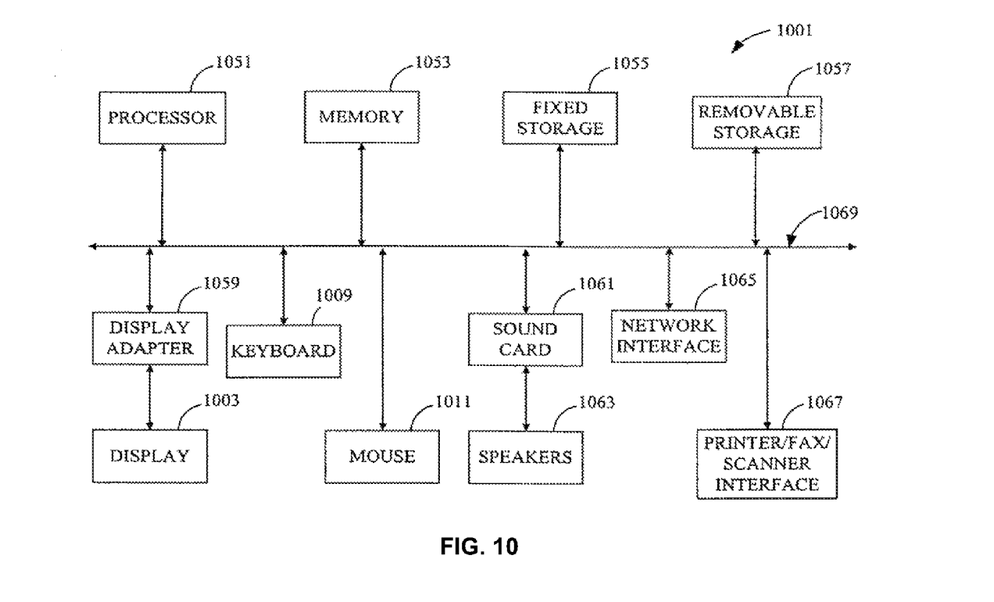
FIG. 10 illustrates a system block diagram of the computer shown in FIG. 9.

FIG. 9 is a computer that can be utilized with the various embodiments of method and processing described herein in one example. FIG. 10 illustrates a system block diagram of the computer shown in FIG. 9. FIGS. 9 and 10 illustrate a schematic and a block diagram, respectively, of an exemplary general purpose computer system 1001 suitable for executing software programs that implement the methods and processes described herein. The architecture and configuration of the computer system 1001 shown and described herein are merely illustrative and other computer system architectures and configurations may also be utilized.

The exemplary computer system 1001 includes a display 1003, a screen 1005, a cabinet 1007, a keyboard 1009, and a mouse 1011. The cabinet 1007 typically houses one or more drives to read a computer readable storage medium 1015, a system memory 1053, and a hard drive 1055 which can be utilized to store and/or retrieve software programs incorporating computer codes that implement the methods and processes described herein and/or data for use with the software programs, for example. A CD and a floppy disk 1015 are shown as exemplary computer readable storage media readable by a corresponding floppy disk or CD-ROM or CD-RW drive 1013. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as optical disks, and specially configured hardware devices such as application-specific integrated circuits (ASICs), programmable logic devices (PLDs), and ROM and RAM devices.

The computer system 1001 includes various subsystems such as a microprocessor 1051 (also referred to as a CPU or central processing unit), system memory 1053, fixed storage 1055 (such as a hard drive), removable storage 1057 (such as a CD-ROM drive), display adapter 1059, sound card 1061, transducers 1063 (such as speakers and microphones), network interface 1065, and/or printer/fax/scanner interface 1067. The computer system 1001 also includes a system bus 1069. However, the specific buses shown are merely illustrative of any interconnection scheme serving to link the various subsystems. For example, a local bus can be utilized to connect the central processor to the system memory and display adapter.

Methods and processes described herein may be executed solely upon CPU 1051 and/or may be performed across a network such as the Internet, intranet networks, or LANs (local area networks) in conjunction with a remote CPU that shares a portion of the processing.

While the exemplary embodiments of the present invention are described and illustrated herein, it will be appreciated that they are merely illustrative and that modifications can be made to these embodiments without departing from the spirit and scope of the invention. Although certain examples describe a headset asset type, the methods and systems described are applicable to other asset types. In further non-limiting examples, assets may be a computer mouse, external loudspeaker, or external storage device. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. One or more non-transitory computer-readable storage media having computer-executable instructions stored thereon which, when executed by one or more computers, cause the one more computers to perform operations comprising:
    detecting coupling of an asset device to a computing device;
    retrieving an asset identifier stored in a computer readable memory of the asset device;
    determining the asset device is a new asset device;
    creating an asset data record corresponding to the asset device;
    determining a user identifier from the computing device, wherein a user corresponding to the user identifier has previously entered login data to authorize access to the computing device;
    associating the asset device with the user identifier in the asset data record; and
    recording a data associated with the asset device in the asset data record.

2. The one or more non-transitory computer-readable storage media of claim 1, wherein detecting coupling of the asset device to a computing device comprises detecting a connection of the asset device to a Universal Serial Bus (USB) port of the computing device.

3. The one or more non-transitory computer-readable storage media of claim 1, wherein detecting coupling of the asset device to a computing device comprises detecting a connection of the asset device to a device coupled to a Universal Serial Bus (USB) port of the computing device.

4. The one or more non-transitory computer-readable storage media of claim 1, wherein determining the asset device is a new asset device comprises searching a plurality of asset data records for an asset data record corresponding to the asset identifier.

5. The one or more non-transitory computer-readable storage media of claim 1, wherein the operations further comprise:
    receiving a user login data at the computing device; and
    determining the user identifier.

6. The one or more non-transitory computer-readable storage media of claim 1, wherein recording a data associated with the asset device in the asset data record comprises recording a date and time data the asset was first used.

7. The one or more non-transitory computer-readable storage media of claim 1, wherein recording a data associated with the asset device in the asset data record comprises recording a usage data of the asset.

8. The one or more non-transitory computer-readable storage media of claim 7, wherein the usage data comprises date and time data corresponding to each coupling and decoupling of the asset device to a different computing device from the computing device.

9. The one or more non-transitory computer-readable storage media of claim 1, wherein recording a data associated with the asset device in the asset data record comprises recording a user preference settings.

10. The one or more non-transitory computer-readable storage media of claim 1, wherein the asset device is a headset device.

11. The one or more non-transitory computer-readable storage media of claim 1, wherein the user identifier is a user login name or a user first and last name.

12. One or more non-transitory computer-readable storage media having computer-executable instructions stored thereon which, when executed by one or more computers, cause the one more computers to perform operations comprising:
    detecting coupling of an asset device to a computing device;
    retrieving an asset identifier stored in a computer readable memory of the asset device;
    determining the asset device is a new asset device;
    creating an asset data record corresponding to the asset device;
    associating the asset device with a user identifier in the asset data record; and
    recording a data associated with the asset device in the asset data record, wherein recording a data associated with the asset device in the asset data record comprises recording a usage data of the asset, and wherein the usage data comprises date and time data corresponding to each coupling and decoupling of the asset device to the computing device.

13. One or more non-transitory computer-readable storage media having computer-executable instructions stored thereon which, when executed by one or more computers, cause the one more computers to perform operations comprising:
    detecting coupling of an asset device to a computing device;
    retrieving an asset identifier stored in a computer readable memory of the asset device;
    determining the asset device is a new asset device;
    creating an asset data record corresponding to the asset device;
    associating the asset device with a user identifier in the asset data record; and
    recording a data associated with the asset device in the asset data record, wherein recording a data associated with the asset device in the asset data record comprises recording a usage data of the asset, and wherein the usage data comprises a computing device identifier to which the asset device was coupled, a user identifier corresponding to a user who was logged into the computing device corresponding to the computing device identifier, date and time data for when the asset device was coupled, and date and time data for when the asset device was decoupled.

14. One or more non-transitory computer-readable storage media having computer-executable instructions stored thereon which, when executed by one or more computers, cause the one more computers to perform operations comprising:
    receiving an indication of a coupling of an asset device to a computing device;
    receiving an asset identifier stored on the asset device, the asset identifier stored in a computer readable memory of the asset device;
    locating an asset data record corresponding to the asset device, the asset data record storing a user identifier associated with the asset identifier; and
    recording a data associated with the asset device in the asset data record, wherein recording a data associated with the asset device in the asset data record comprises recording a usage data of the asset device, wherein the usage data comprises a computing device identifier to which the asset device was coupled, a user identifier corresponding to a user who was logged into the computing device corresponding to the computing device identifier, date and time data for when the asset device was coupled, and date and time data for when the asset device was decoupled.

15. The one or more non-transitory computer-readable storage media of claim 14, wherein the operations further comprise: retrieving and implementing user preference setting from the asset data record.

16. The one or more non-transitory computer-readable storage media of claim 14, wherein the operations further comprise: retrieving a headset start date from the asset data record and identifying an asset warranty expiration occurrence.

17. The one or more non-transitory computer-readable storage media of claim 14, wherein the operations further comprise: determining whether a user identifier corresponding to a current user of the computing device matches the user identifier associated with the asset identifier in the asset data record.

18. The one or more non-transitory computer-readable storage media of claim 14, wherein receiving an indication of a coupling of an asset device to a computing device comprises receiving an indication that the asset device has been coupled to a Universal Serial Bus (USB) port of the computing device.

19. The one or more non-transitory computer-readable storage media of claim 14, wherein the operations further comprise: receiving an indication of a decoupling of the asset device from a computing device.

20. One or more non-transitory computer-readable storage media having computer-executable instructions stored thereon which, when executed by one or more computers, cause the one more computers to perform operations comprising:
- receiving an indication of a coupling of an asset device to a computing device;
- receiving an asset identifier stored on the asset device, the asset identifier stored in a computer readable memory of the asset device;
- locating an asset data record corresponding to the asset device, the asset data record storing a user identifier associated with the asset identifier; and
- recording a data associated with the asset device in the asset data record, wherein recording a data associated with the asset device in the asset data record comprises recording a usage data of the asset device, and wherein the usage data comprises date and time data corresponding a coupling and a decoupling of the asset device to the computing device.

* * * * *